3,326,967
TRIHALOMETHYLTHIO SUBSTITUTED N,N'-SULFONYL-BIS-CARBAMATES

Rudi F. W. Rätz and Philip M. Pivawer, Hamden, Conn., assignors to Olin Mathieson Chemical Corporation, New Haven, Conn., a corporation of Virginia
No Drawing. Filed Nov. 26, 1965, Ser. No. 510,077
10 Claims. (Cl. 260—479)

This invention relates to mono- and bis(trihalomethylsulfenated) N,N'-sulfonyl-bis-carbamates having the following general formula:

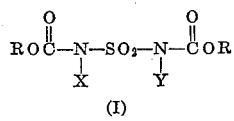

(I)

wherein R represents alkyl, substituted alkyl, aryl or substituted aryl; X represents hydrogen or a trihalomethylthio group, and Y represents a trihalomethylthio group.

It has been found that the substituted N,N'-sulfonyl-bis-carbamates I are provided in good yield and high purity by the reaction of trihalomethylsulfenyl chlorides with N,N'-sulfonyl-bis-carbamates in the presence of appropriate basic materials. The preparation of the compounds I thus proceeds in accordance with the following equation:

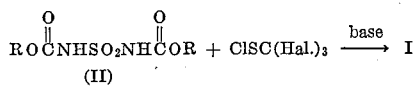

(II)

The N,N'-sulfonyl-bis-carbamates (II) utilized as intermediates in the practice of this invention are readily available by the reaction of sulfuryl diisocyanate with appropriate alcohols, phenols, and naphthols. For example, preparation of these compounds has been previously described by Onodera in Kogyo Kagaku Zasshi, 65, 790–3 (1962), C.A. 57, 14932 (1962), and a typical preparation of a compound having the Formula II is illustrated by Example 1 hereinafter.

A wide variety of the derivatives II (wherein R is as previously defined) may be used in the practice of this invention. However, preferred embodiments of this invention are provided when R represents alkyl or haloalkyl having 1–8 carbon atoms; aryl having 6–10 carbon atoms, i.e., phenyl, tolyl, naphthyl; or alkoxyaryl having 7–11 carbon atoms such as methoxyphenyl.

Similarly, any of the known trihalomethylsulfenyl halides may be reacted with the compounds II to provide derivatives included in the general Formula I. For instance, tribromomethylsulfenyl bromide, trifluoromethylsulfenyl chloride, and difluorochloromethylsulfenyl chloride may be employed as starting reactants. Preferably, however, trichloromethylsulfenyl chloride and dichlorofluoromethylsulfenyl chloride are utilized as intermediates in the practice of this invention.

The preparation of the mono- and bis(trihalomethylsulfenated) derivatives is conveniently performed in the presence of an inert diluent and selected basic materials. Suitable diluents include water, the lower aliphatic alcohols and tetrahydrofuran. A number of basic materials may be employed in these reactions such as for example the alkali metal and the alkaline earth metal hydroxides as well as tertiary amines and various alkoxides. Generally, the reactions can be carried out at a reaction temperature range of about 0°–50° C. The mono(trihalomethylsulfenated)-derivatives are substantially only provided when equimolar amounts of the compound II, the trihalomethylsulfenyl halide and base are utilized. However, the bis(trihalomethylsulfenated)-derivatives are readily obtained by utilizing another mole of each of the halide and required base.

The compounds I are useful pesticides. They are valuable foliar fungicides, and several of the derivatives included in the Formula I have also demonstrated high activity as soil fungicides. Furthermore, both the mono- and bis(trihalomethylsulfenated) - N,N'-sulfonyl - bis - carbamates I are characterized by herbicidal activity. When applied in post-emergence treatment, they are effective in selectively controlling the growth of a variety of broadleaf and grassy weeds in the area of valuable crop species particularly cotton, corn and soybean plants.

The following examples will serve to illustrate the preparation of several of the substituted N,N'-sulfonyl-bis-carbamates of this invention.

Example 1

Sulfuryl diisocyanate (9.4 ml.; 0.1 mole) dissolved in 100 ml. of benzene was added at 5°–10° C. to 6.4 g. (0.2 mole) of methanol dissolved in 100 ml. of benzene. A precipitate formed, was filtered, and was dried to provide 21.4 g. (100% yield) of crude N,N'-sulfonyl-bis(carbamic acid, methyl ester). After one recrystallization from isopropyl alcohol, the crystals melted at 161°–165° C. The following analytical data confirmed the structure of the N,N'-sulfonyl-bis(carbamic acid, methyl ester).

Analysis.—Calcd. for $C_4H_8N_2SO_6$: C, 22.62; H, 3.77; N, 13.21; S, 15.10. Found: C, 22.43; H, 3.88; N, 13.37: S, 15.03.

Example 2

N,N'-sulfonyl-bis(carbamic acid, 2,2,2-trichloroethyl ester) (4.46 g., 0.01 mole) was dissolved in 25 ml. of water containing 0.8 g. (0.02 mole) of sodium hydroxide. The solution was cooled to 5°–10° C. and 7.44 g. (0.02 mole) of trichloromethylsulfenyl chloride was added over 15 minutes. The solution was stirred for an additional one half hour and the precipitate that formed was filtered and dried. The crude solid was slurried with benzene and after filtration 5.3 g. of starting material was recovered. Evaporation of the benzene left an oily layer which solidified on standing overnight. The solid was recrystallized from n-heptane to give 2.5 g. (16%) of a crystalline material, M.P. 120°–130° C. Evaporation of the heptane filtrate gave a second crop of crystals, M.P. 105°–118° C. Recrystallization of the obtained solids provided a product melting at 140°–142° C. The following analytical data revealed that N,N'-sulfonyl-bis[(N-trichloromethylthio)carbamic acid, 2,2,2-trichloroethyl ester] had been obtained.

Analysis.—Calcd. for $C_6H_4Cl_{12}N_2S_3O_6$: C, 12.89; H, .054; Cl, 57.0; N, 3.76; S, 12.89. Found: C, 13.31; H, 0.76; Cl, 56.5; N, 4.15; S, 12.80.

An infrared spectrum showed no NH absorption and a C=O band at 5.65μ.

Example 3

To 7.2 g. (0.03 mole) of N,N'-sulfonyl-bis(carbamic acid, ethyl ester) dissolved in 20 ml. of isopropyl alcohol was added 2.4 g. (0.06 mole) of sodium hydroxide dissolved in 25 ml. of water. The solution was cooled to 5° C. and 11.2 g. (0.06 mole) of trichloromethylsulfenyl chloride was added rapidly over a 5-minute period. The reaction mixture was stirred for an additional half hour and then filtered to give 15.1 g. (93% yield) of a crystalline solid. Recrystallization of 10 g. of this material from 100 ml. of n-heptane with enough chloroform added to the hot heptane to dissolve most of the solid, gave 8.2 g. of a crystalline material having a melting point of 134°–135° C. The following analytical data revealed that N,N'-sulfonyl-bis[(N-trichloromethylthio)carbamic acid, ethyl ester] had been obtained.

Analysis.—Calcd. for $C_8H_{10}Cl_6N_2S_3O_6$: C, 17.81; H, 1.86; Cl, 39.52; N, 519; S, 17.81. Found: C, 17.80; H, 1.95; Cl, 39.30; N, 5.55; S, 17.83.

Example 4

In a 125 ml. Erlenmeyer flask was placed 8.92 g. of N,N'-sulfonyl-bis(carbamic acid, 2,2,2-trichloroethyl ester) dissolved in 20 ml. of tetrahydrofuran, and 0.8 g. of sodium hydroxide in 15 ml. of water was added to the flask. The solution was cooled to 5° C. and 3.72 g. of trichloromethylsulfenyl chloride was added over 5 minutes. The solution was allowed to stir for an additional one half hour. Then 25 ml. of water was added and the solution obtained was extracted with three 20 ml. portions of chloroform, the extract dried over magnesium sulfate, filtered and the filtrate evaporated to a viscous oil. The oil was now dissolved in a small amount of benzene and to this solution 100 ml. of hexane was added. Upon cooling 4.4 g. of starting material separated and was recovered by filtration. Further evaporation of the filtrate afforded 2.5 g. (20%) of a crystalline material, M.P. 108°–109° C. The following analytical data revealed that N,N'-sulfonyl-(N-trichloromethylthio)bis-carbamic acid, 2,2,2-trichloroethyl ester had been obtained.

*Analysis.*—Calcd. for $C_7H_5Cl_9N_2S_2O_6$: C, 14.09; H, 0.84; Cl, 53.52; N, 4.70; S, 10.74. Found: C, 14.46; H, 1.11; Cl, 52.6; N, 4.80; S, 10.78.

Example 5

To 7.2 g. (0.03 mole) of N,N'-sulfonyl-bis(carbamic acid, ethyl ester) dissolved in 20 ml. of tetrahydrofuran was added 1.2 g. (0.03 mole) of sodium hydroxide dissolved in 15 ml. of water. The solution was cooled to 10° C. and 5.6 g. (0.3 mole) of trichloromethylsulfenyl chloride was added. Two layers formed after addition was complete and the reaction mixture was stirred for an additional 15 minutes. The water layer was separated and the organic layer was extracted with two 20 ml. portions of water. The combined water extracts were extracted with three 20 ml. portions of ether which were combined with the original organic layer. After drying over magnesium sulfate, filtration and removal of the solvents, an oily residue was obtained which finally crystallized.

The solid was dissolved in 25 ml. of benzene and the addition of an equal amount of heptane resulted in the precipitation of 2.2 g. of unreacted starting material (31% recovery). The mixture was filtered, and the filtrate evaporated to dryness to give 7.9 g. (67% yield) of a solid product which was washed with cold ethanol and recrystallized from carbon tetrachloride to give 6.8 g. of crystalline material, M.P. 101°–108° C. Further recrystallization provided a solid, melting at 108°–109° C. The following analytical data revealed that N,N'-sulfonyl-(N-trichloromethylthio)bis-carbamic acid, ethyl ester had been obtained.

*Analysis.*—Calcd. for $C_7H_{11}Cl_3N_2S_2O_6$: C, 21.59; H, 2.83; Cl, 27.25; N, 7.28; S, 16.45. Found: C, 21.52; H, 2.65; Cl, 27.50; N, 7.79; S, 16.48.

Example 6

To 4.28 g. (0.02 mole) of N,N'-sulfonyl-bis(carbamic acid, methyl ester) dissolved in 15 ml. of isopropyl alcohol was added 1.6 g. (0.04 mole) of sodium hydroxide in 25 ml. of water. The solution was cooled to 5° C. and 7.44 g. (0.04 mole) of trichloromethylsulfenyl chloride was added during 5 minutes. A solid precipitate formed, was filtered, washed with isopropyl alcohol and water and dried to provide 7.7 g. (73%) of a solid material. This product was recrystallized from n-heptane and chloroform as described in Example 3 to give 6.3 g. of material, M.P. 148°–151° C. The following analytical data revealed that N,N'-sulfonyl-bis[(N-trichloromethylthio)carbamic acid, methyl ester] had been obtained.

*Analysis.*—Calcd. for $C_6H_6Cl_6N_2S_3O_6$: C, 14.09; H, 1.17; Cl, 41.68; N, 5.48; S, 18.79. Found: C, 14.32; H, 1.26; Cl, 41.60; N, 5.51; S. 18.92.

Example 7

The amount of 5.4 g. (0.02 mole) of N,N'-sulfonyl-bis(carbamic acid, isopropyl ester) was sulfenated by the procedure described in the foregoing examples to give 10.7 g., (94%) of N,N'-sulfonyl-bis[(N-trichloromethylthio)carbamic acid, isopropyl ester]. After the product was recrystallized from a heptane-chloroform mixture, a crystalline material in the amount of 8.2 g. was provided, M.P. 147°–151° C. The following analytical data confirmed the above structure.

*Analysis.*—Calcd. for $C_{10}H_{14}Cl_6N_2S_3O_6$: C, 21.16; H, 2.47; Cl, 37.57; N, 4.94; S, 16.93. Found: C, 21.35; H, 2.66; Cl, 37.10; N, 5.22; S. 16.99.

Example 8

The amount of 6.72 g. (0.02 mole) of N,N'-sulfonyl-bis(carbamic acid, phenyl ester) was placed in 30 ml. of isopropyl alcohol and the mixture cooled to 0° C. Aqueous sodium hydroxide 1.6 g. (0.04 mole) was added and the mixture stirred for an hour until all of the sulfonyl bis-carbamate had dissolved. Then 7.44 g. (0.04 mole) of trichloromethylsulfenyl chloride was added all at once. During this addition a precipitate formed which was filtered after about 2 minutes to give 4.8 g. (38%) of product. After washing with cold ethanol and recrystallization from n-heptane-chloroform as described in Example 7, the amount of 2.8 g. of crystals melting at 169°–173° C. was obtained. The following analytical data revealed that N,N'-sulfonyl-bis[(N-trichloromethylthio)carbamic acid, phenyl ester] had been obtained.

*Analysis.*—Calcd. for $C_{16}H_{10}Cl_6N_2S_3O_6$: C, 30.24; H, 1.57; Cl, 33.54; N, 4.41; S, 15.12. Found: C, 30.33; H, 1.62; Cl, 33.50; N, 4.83; S, 15.23.

Example 9

The amount of 7.92 g. (0.02 mole) of N,N'-sulfonyl-bis(carbamic acid, p-methoxyphenyl ester) was placed in 30 ml. of isopropyl alcohol and 1.6 g. (0.04 mole) of sodium hydroxide in 25 ml. of water was added. The solution was stirred for 15 minutes, cooled to 5° C. and 7.44 g. (0.04 mole) of trichloromethylsulfenyl chloride was added. A bright red color appeared and gradually faded. No solid precipitate formed; however, an oily layer appeared on the bottom. After decantation of the water, the addition of ethanol resulted in the precipitation of solid material which was filtered to give 0.9 g. (6%) of N,N'-sulfonyl-bis[(N-trichloromethylthio)carbamic acid, p-methoxyphenyl ester]. This material was recrystallized from heptane-chloroform to provide 0.6 g. of solid melting at 151°–154° C. The following analytical data confirmed the above structure.

*Analysis.*—Calcd. for $C_{18}H_{14}Cl_6N_2S_3O_8$: C, 31.08; H, 2.01; Cl, 30.65; N, 4.03; S, 13.81. Found: C, 31.33; H, 2.33; Cl, 30.6; N, 4.10; S, 13.78.

What is claimed is:

1. Substituted N,N'-sulfonyl-bis-carbamates having the formula:

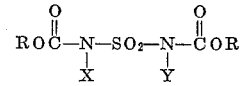

wherein each R may independently represent alkyl having 1–8 carbon atoms, haloalkyl having 1–8 carbon atoms, aryl having 6–10 carbon atoms or alkoxyaryl having 7–11 carbon atoms; and X represents hydrogen, a trichloromethylthio- or dichlorofluoromethylthio-moiety; and Y represents a trichloromethylthio- or a dichlorofluoromethylthiomoiety.

2. The compounds of claim 1 where X and Y each represent a trichloromethylthio-moiety and R is alkyl having 1–8 carbon atoms.

3. The compound of claim 2 N,N'-sulfonyl-bis[(N-trichloromethylthio)carbamic acid, methyl ester].

4. The compounds of claim 1 wherein X and Y each represent a trichloromethylthio-moiety and R is haloalkyl having 1–8 carbon atoms.

5. The compounds of claim 1 wherein X and Y each represent a trichloromethylthio-moiety and R is aryl having 6–10 carbon atoms.

6. The compounds of claim 1 wherein X and Y each represent a trichloromethylthio-moiety and R is an alkoxyaryl having 7–10 atoms.

7. The compound of claim 6 N,N'sulfonyl-bis[(N-trichloromethylthio)carbamic acid, p-methoxyphenyl ester].

8. The compounds of claim 1 wherein X is hydrogen, Y represents trichloromethylthio and R is alkyl having 1–8 carbon atoms.

9. The compounds of claim 1 wherein X is hydrogen, Y represents trichloromethylthio and R is haloalkyl having 1–8 carbon atoms.

10. The compound of claim 9 N,N'-sulfonyl-(N-trichloromethylthio)bis-carbamic acid, 2,2,2-trichloroethyl ester.

References Cited
FOREIGN PATENTS 1,186,044  1/1965  Germany.

OTHER REFERENCES

Degering et al.: J. Am. Pharm. Assoc., vol. 39, pp. 624 to 627 (1950).

Appel el al.: Ber. Dent. Chem., vol. 91, pp. 1200 to 1203 (1958).

Onodera: Chemical Abstracts, vol. 57, p. 14932g (1962).

LORRAINE A. WEINBERGER, *Primary Examiner.*

IRVING R. PELLMAN, *Assistant Examiner.*